Feb. 14, 1961     M. LANE ET AL     2,971,648
METHOD AND APPARATUS FOR CONTROLLING THE FEED OF
FILTER AID TO A FILTER ARRANGEMENT
Filed June 19, 1957
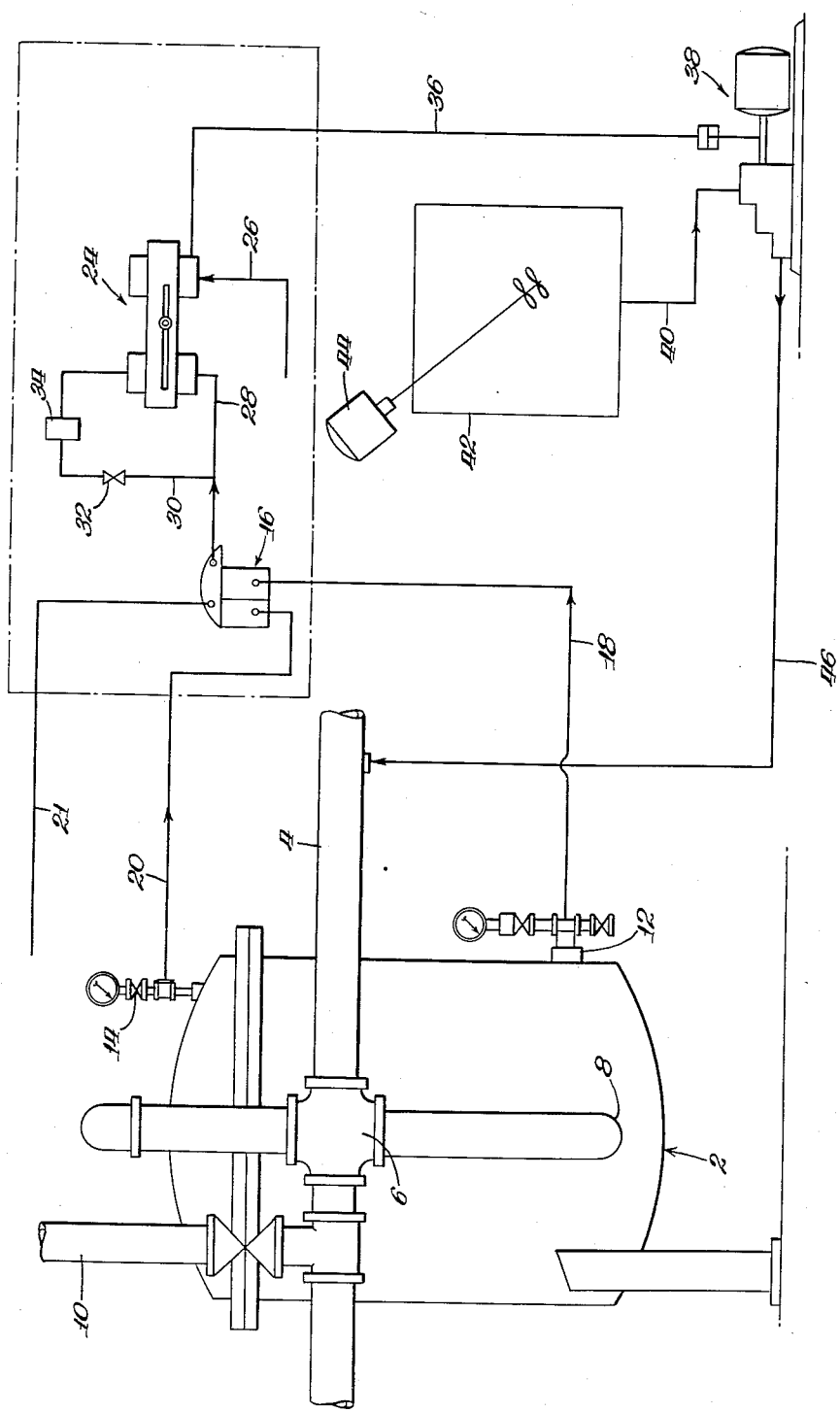

United States Patent Office 2,971,648
Patented Feb. 14, 1961

2,971,648

METHOD AND APPARATUS FOR CONTROLLING THE FEED OF FILTER AID TO A FILTER ARRANGEMENT

Marvin Lane, Cranford, N.J., and Jacob S. Samkoff, Yonkers, N.Y., assignors, by mesne assignments, to Union Tank Car Company, Chicago, Ill., a corporation of New Jersey Filed June 19, 1957, Ser. No. 666,512

6 Claims. (Cl. 210—75)

The invention relates to a method and apparatus of controlling the quantity of filter aid such as diatomaceous earth co-mingled with the influent to a filter arrangement.

It is well known in the art that many filters employ a coating of diatomaceous earth to aid the filtering action. It is also well known that the effective length of the filter run from a time standpoint may be increased by adding to the influent an additional dosage of diatomaceous earth, sometimes called body feed. The effect of the addition of extra quantities of the earth to the influent is the tendency to prevent the filtered turbidity from forming a solid coating on the filter elements, which in turn would offer a high resistance to flow with a resultant high pressure loss across the elements. The diatomaceous earth tends to maintain an increased degree of porosity in the coating on the element as well as aiding in the removal of foreign particles from the filtered media. This maintenance of porosity in the filter element results in a pressure loss across the filter that tends to build up at a slower rate though filtering efficiency is not substantially hampered. Obviously, this results in a longer filtering run before cleaning and recoating is necessary.

In many filter applications, such as industrial waste waters and process liquors, the concentration and/or the nature of the turbidity to be removed, varies considerably over the course of a normal filter run. We have discovered that in many instances, the change in media characteristics varies rapidly in point of time and consideration of efficiency and the like would make it desirable to vary the amount of body feed to the influent in some relation to the varying condition of the media. This could very well result in more satisfactory filtration and increase of the length of each filtering run.

Accordingly, it is a primary object of the invention to provide a simple and effective means for varying the body feed dosage to the filter influent whereby more efficient filtering operation results.

It is a particular object of the invention to provide both a method and apparatus for controlling or adjusting the body feed as above described in proportion to the needed requirements.

Particularly, the invention comprehends the provision of measuring the pressure differential across the filtering unit, changing the measured pressure differential into a determined signal, itself proportional to said pressure differential, and thereafter measuring the variation of intensity of the signal per unit of time to establish a rate of change factor and then proportioning the volume of body feed flow to the variation in the rate in a determined manner.

It is a further object of the invention to provide an arrangement of the type described that will function automatically and thereby dispense with manual control thereof.

These and other objects of the invention will become apparent in the course of the following description and from an examination of the concerned drawing, wherein the single figure is a partially schematic illustration of the filtering arrangement incorporating the invention.

Considering the figure, it will be appreciated that a conventional filtering tank, indicated generally at 2, is provided, having an influent pipe 4 and an appropriate valving arrangement 6 associated therewith. In normal filtering operation the influent is directed to an intake point 8, usually at the bottom of the filter, and an outlet or effluent pipe 10 communicates with an upper portion of the filter to carry the filtered media to service. The valve 6 and the other pipe connections are arranged for utility in backwashing and cleaning operations and the like. Operatively adjacent the intake point 8, a pressure sensing device 12 is provided. Additionally, a second pressure sensing device 14 is provided operatively adjacent the service line 10 whereby the devices 12 and 14 will effectively indicate the pressure drop across the internal filtering elements (not shown).

A differential pressure instrument 16 is provided having operative connections 18 and 20 with the devices 12 and 14 respectively. The instrument measures the differential pressure across the filter unit. The instrument 16 may have an air supply connection 21 communicating therewith, whereby it may offer an output signal, preferably of pressured air, in a determined relation to the pressure differential continuously measured. A secondary sensing mechanism 24 is also provided, said mechanism 24 also having an independent air supply 26 communicating therewith. An output line 28 is arranged to carry an output signal from the instrument 16 to a point on one side of a mechanical balance arrangement which forms part of the secondary sensing mechanism 24. An additional line 30 communicates with the line 28 at a point intermediate the instrument 16 and sensing mechanism 24, said line 30 extending to and operatively connecting with a point on the balance in physical opposition to the connection thereto of line 28. A manually controllable needle valve 32 and a volume tank 34 are preferably provided in the line 30.

It will be understood by those skilled in the art, that an output air signal line 36 extends from the mechanism 24 to a feed control pump arrangement or the like 38. The pump arrangement may be a positive displacement pump with a pneumatic stroke adjusting cylinder or any functionally similar arrangement. A line 40 communicates with a reservoir 42 which contains a base charge of filter aid such as diatomaceous earth, which, for convenience of operation may be in slurry form. A stirring mechanism 44 maintains the slurry in an agitated homogeneous condition. A line 46 communicates with the pump arrangement 38 at one end thereof and with the influent line 4 at the other end thereof, whereby it will be understood that the diatomaceous slurry will be injected into and co-mingled with the influent in line 4 in response to the action of the pump arrangement 38.

In the operation of the arrangement, it will be understood that the differential pressure instrument 16 is continuously sensing the pressure difference between the intake and outlet points of the filter 2. As a result of this continuous and automatic sensing, a signal, which is proportional to the differential measured, is continuously provided in line 28. It will be understood, of course, that during any filtering run the measured differential pressure across the filter may be constantly changing with the result that the intensity of the output signal in line 28 is usually subject to constant variation. Frequently, however, this output signal is constantly increasing in response to an increasing pressure loss across the filter.

The needle valve or bleeding valve 32 is preferably preset to accommodate a certain minimal flow of pressured air to the tank 34. This setting, of course, may vary in different installations. In effect, the valve 32 is operating to induce a lag in pressure distribution between the lines 28 and 30 which operatively extend to opposite sides of the balance arrangement. The setting of this valve is such that if change in intensity of the output signal in line 28 is at a predetermined or constant rate per unit of time, a substantial constant condition of imbalance in the mechanism 24 will be maintained. This constant condition will cause a secondary output signal in line 36 to remain substantially constant. However, should the rate of change of the output signal in line 28 vary from the predetermined standard rate for which the valve 32 has been set, a resultant or different condition will be set up in the mechanism 24 which will in turn vary the output signal in the line 36 in substantial proportion to the variation of the rate of change of the output signal in line 28 to the standard or preset rate of change. As the output signal in line 36 changes, the stroke adjustment in the pump 38 will vary, and an increase or decrease of the flow of body feed to the influent will result per unit of time. Therefore, it will be seen that if the rate of variation of the output signal in line 28 is below the predetermined standard then the body feed flow in line 46 will be reduced. On the other hand, if variation in intensity of output signal in line 28 is above the standard rate, the output signal in line 36 is increased and the flow of body feed in the line 46 is likewise increased. The net result of the entire arrangement is that the flow of body feed or filter aid to the influent line is varied during the filtering run in a determined relation to the rate of change of the pressure differential across the filtering unit.

As earlier noted the rate of change of pressure differential across the filter unit is substantially correlated to the change in turbidity conditions in the filter media. Accordingly, the invention herein disclosed will result in a desired proportioning of body feed dosage to the influent whereby longer and more effective filtering runs will result.

The invention as disclosed is by way of illustration and not limitation and may be subject to various modifications without departing from the spirit thereof or the scope of the appended claims.

What is claimed is:

1. In a method of controlling the flow of filter aid co-mingled with the influent to a filter unit, the steps of measuring pressure differential across the unit, producing an output signal proportional to said differential, measuring the rate of change of the variation in intensity of said signal, and controlling the volume of aid co-mingled with the influent in response to said measured rate of change.

2. In a method of automatically controlling the amount of diatomaceous earth co-mingled with the influent to a filter unit, the steps of continuously measuring the pressure differential across said unit, measuring the rate of change of the measured differential per unit of time, and controlling the addition of earth to the influent in a determined relation to the measured rate of change.

3. In a filter arrangement, an influent intake and an effluent exhaust, a first pressure sensing point in the influent intake and a second pressure sensing point at the effluent exhaust, a differential pressure instrument operatively connected to the points to measure the pressure differential across the filter, means associated with the instrument to produce an output signal having intensity proportional to the measured pressure differential, a reservoir of diatomaceous earth operatively connected to the influent intake, adjustable feeding means arranged to co-mingle said earth with said influent, and control means to substantially measure the rate of change of the intensity of said output signal and to control and adjust said feeding means to vary the amount of earth co-mingled with said influent in a determined relation to said measured change of intensity.

4. A filter arrangement according to claim 3, wherein said output signal is an air signal, and said control means comprises a physical balance arrangement, a line establishing communication between said control means and one side of said arrangement to transmit the air signal thereto, another line communicating with said first mentioned line intermediate said control means and said arrangement, said other line establishing communication with the other side of said arrangement, and controllable bleeding means in said other line to restrict the transmission of said air signal to the other side of said arrangement.

5. A filter arrangement according to claim 4, and including a volume tank in said other line intermediate said bleeding means and the other side of said arrangement.

6. A filter arrangement according to claim 5, wherein said bleeding means comprises a manually controllable needle valve.

References Cited in the file of this patent

UNITED STATES PATENTS

| | | |
|---|---|---|
| 2,005,773 | De Florez | June 25, 1935 |
| 2,152,900 | Manning | Apr. 4, 1939 |
| 2,301,430 | Malanowski | Nov. 10, 1942 |
| 2,423,172 | Booth | July 1, 1947 |
| 2,455,130 | Lomax | Nov. 30, 1948 |
| 2,499,494 | Greer | Mar. 7, 1950 |
| 2,678,134 | Middleton | May 11, 1954 |